United States Patent
Nakayama et al.

(10) Patent No.: US 10,473,756 B2
(45) Date of Patent: Nov. 12, 2019

(54) SENSOR AND ESTIMATING METHOD

(71) Applicant: Panasonic Intellectual Property Management Co., Ltd., Osaka (JP)

(72) Inventors: Takeshi Nakayama, Hyogo (JP); Shoichi Iizuka, Osaka (JP); Naoki Honma, Iwate (JP); Dai Sasakawa, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 321 days.

(21) Appl. No.: 15/631,367

(22) Filed: Jun. 23, 2017

(65) Prior Publication Data

US 2018/0011169 A1 Jan. 11, 2018

(30) Foreign Application Priority Data

Jul. 5, 2016 (JP) .................................. 2016-133283
Mar. 28, 2017 (JP) .................................. 2017-063507

(51) Int. Cl.
*G01S 7/292* (2006.01)
*G01S 13/50* (2006.01)
(Continued)

(52) U.S. Cl.
CPC .............. *G01S 7/292* (2013.01); *G01S 7/411* (2013.01); *G01S 13/003* (2013.01); *G01S 13/42* (2013.01);
(Continued)

(58) Field of Classification Search
CPC ...... G01S 13/931; G01S 13/003; G01S 13/04; G01S 7/411; G01S 13/87; G01S 13/42;
(Continued)

(56) References Cited

U.S. PATENT DOCUMENTS 5,959,571 A * 9/1999 Aoyagi ................. G01S 13/325
342/145
7,119,734 B2 * 10/2006 Nakano ................... G01S 7/412
342/70
(Continued)

FOREIGN PATENT DOCUMENTS

JP 2001-159678 6/2001
JP 2005-292129 10/2005
(Continued)

*Primary Examiner* — Olumide Ajibade Akonai
(74) *Attorney, Agent, or Firm* — Greenblum & Bernstein, P.L.C.

(57) ABSTRACT

A sensor includes a transmit antenna, a receive antenna, circuitry, and a memory. The transmit antenna includes N transmit antenna elements each transmitting a transmit signal. The receive antenna includes M receive antenna elements each receiving N receive signals including reflection signals reflected by an organism. The circuitry extracts a second matrix corresponding to a predetermined frequency range from an N×M first matrix representing propagation characteristics between each transmit antenna element and each receive antenna element calculated from the receive signals. The circuitry estimates the position of the organism by using the second matrix, and calculates a radar cross-section value with respect to the organism, based on the estimated position and the positions of the transmit antenna and the receive antenna. The circuitry then estimates the posture of the organism by using the calculated radar cross-section value and information indicating associations between radar cross-section values and postures of the organism.

5 Claims, 7 Drawing Sheets

(51) Int. Cl.
  *G01S 7/41* (2006.01)
  *G01S 13/00* (2006.01)
  *G01S 13/42* (2006.01)
  *G01S 7/35* (2006.01)
  *G01S 13/89* (2006.01)
  *G01S 13/66* (2006.01)
(52) U.S. Cl.
  CPC .............. *G01S 13/50* (2013.01); *G01S 13/66* (2013.01); *G01S 7/354* (2013.01); *G01S 13/89* (2013.01); *G01S 2007/356* (2013.01)
(58) Field of Classification Search
  CPC . G01S 13/34; G01S 7/352; G01S 7/41; G01S 13/50; G01S 7/292; G01S 7/354; G01S 7/415; A61B 5/1116; A61B 5/1117
  See application file for complete search history.

(56) References Cited

U.S. PATENT DOCUMENTS

| | | | | |
|---|---|---|---|---|
| 2004/0246167 | A1* | 12/2004 | Kumon | G01S 7/41 342/70 |
| 2005/0093736 | A1* | 5/2005 | Fukute | G01S 7/354 342/70 |
| 2013/0335257 | A1 | 12/2013 | Abrahamson | |
| 2016/0025847 | A1 | 1/2016 | Okuya et al. | |

FOREIGN PATENT DOCUMENTS

| | | |
|---|---|---|
| JP | 2014-512526 | 5/2014 |
| JP | 2014-190724 | 10/2014 |
| JP | 2015-117972 | 6/2015 |
| WO | 2014/141519 | 9/2014 |

* cited by examiner

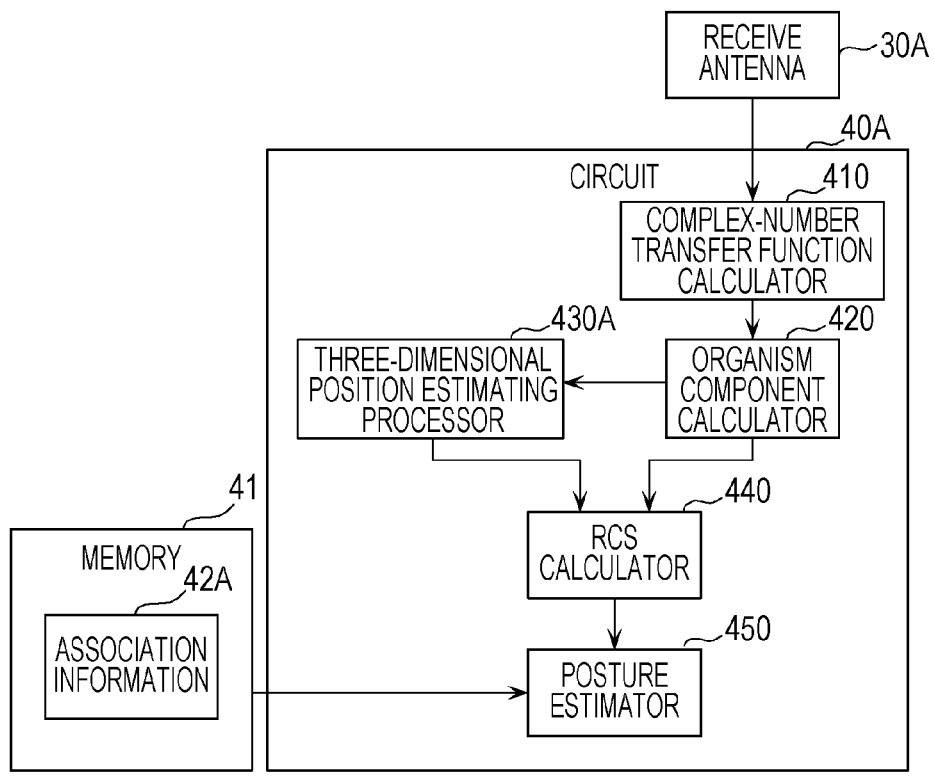

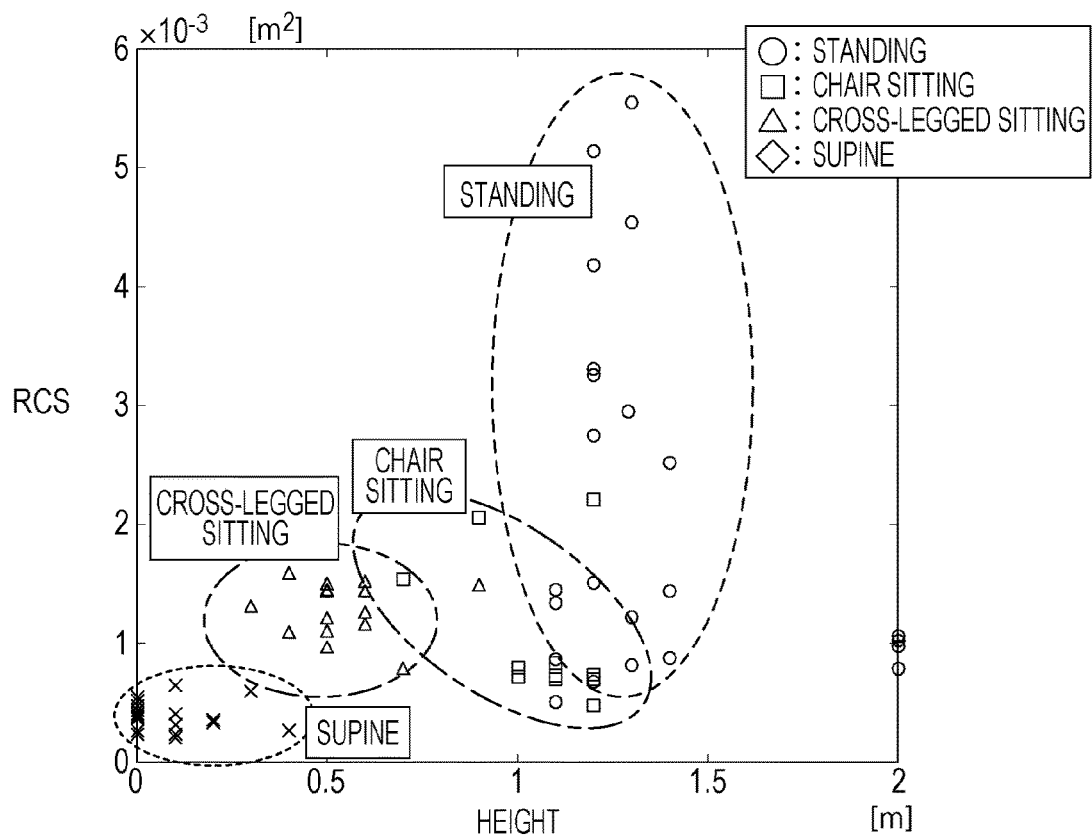

SENSOR AND ESTIMATING METHOD

BACKGROUND

1. Technical Field

The present disclosure relates to a sensor and an estimating method for estimating the posture of an organism by utilizing a wireless signal.

2. Description of the Related Art

Various approaches to finding the position of an organism, for example, a person, by using a wireless signal have been proposed. The following approaches, for example, have been discussed: detecting an organism by using a Doppler sensor; detecting the motion and the state of an organism by using a Doppler sensor and a filter; detecting the position and the state of a person by analyzing components including Doppler shift components based on Fourier transform; estimating the position and the state of an organism by machine learning based on channel information obtained from plural antennas and sensor information obtained from various sensors; and estimating the state of an organism by using plural antennas and plural ultrasound radars (see, for example, Japanese Unexamined Patent Application Publication No. 2001-159678).

SUMMARY

However, it is desirable to make further improvements in the precision of estimating the posture of an organism by utilizing a wireless signal.

In one general aspect, the techniques disclosed here feature a sensor including a transmit antenna, a receive antenna, circuitry, and a memory. The transmit antenna includes N transmit antenna elements. Each of the N transmit antenna elements transmits a transmit signal to a predetermined range within which an organism is likely to exist. N is a natural number of two or greater. The receive antenna includes M receive antenna elements. Each of the M receive antenna elements receives N receive signals including reflection signals generated as a result of some of the N transmit signals transmitted from the N transmit antenna elements being reflected by the organism. M is a natural number of two or greater. The circuitry calculates an N×M first matrix having complex-number transfer function components, each of the complex-number transfer function components representing propagation characteristics between a transmit antenna element and a receive antenna element, from the N receive signals received by each of the M receive antenna elements for a predetermined period. The circuitry extracts a second matrix corresponding to a predetermined frequency range from the first matrix. The second matrix represents components influenced by a vital sign including at least one of respiration, pulse, and motion of the organism. The circuitry estimates a position of the organism with respect to the sensor by using the second matrix. The circuitry calculates a first distance indicating a distance between the organism and the transmit antenna and a second distance indicating a distance between the organism and the receive antenna, based on the estimated position of the organism, a position of the transmit antenna, and a position of the receive antenna. The circuitry calculates a radar cross-section value with respect to the organism by using the first and second distances. The circuitry estimates a posture of the organism by using the calculated radar cross-section value and information indicating associations between radar cross-section values and postures of the organism stored in the memory.

According to an aspect of the present disclosure, it is possible to quickly and highly precisely estimate the posture of an organism by utilizing a wireless signal.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a block diagram illustrating an example of the functional configuration of a circuit and a memory according to the second embodiment;

FIG. 7 is a table illustrating information indicating the association between RCS values and heights and postures according to the second embodiment;

FIG. 9 is a graph illustrating the experiment results obtained by using the experimental system shown in FIG. 8; and FIG. 10 is a table indicating specific examples of first through fourth RCS ranges and first through fourth heights obtained from the experiment results.

Figure 1:
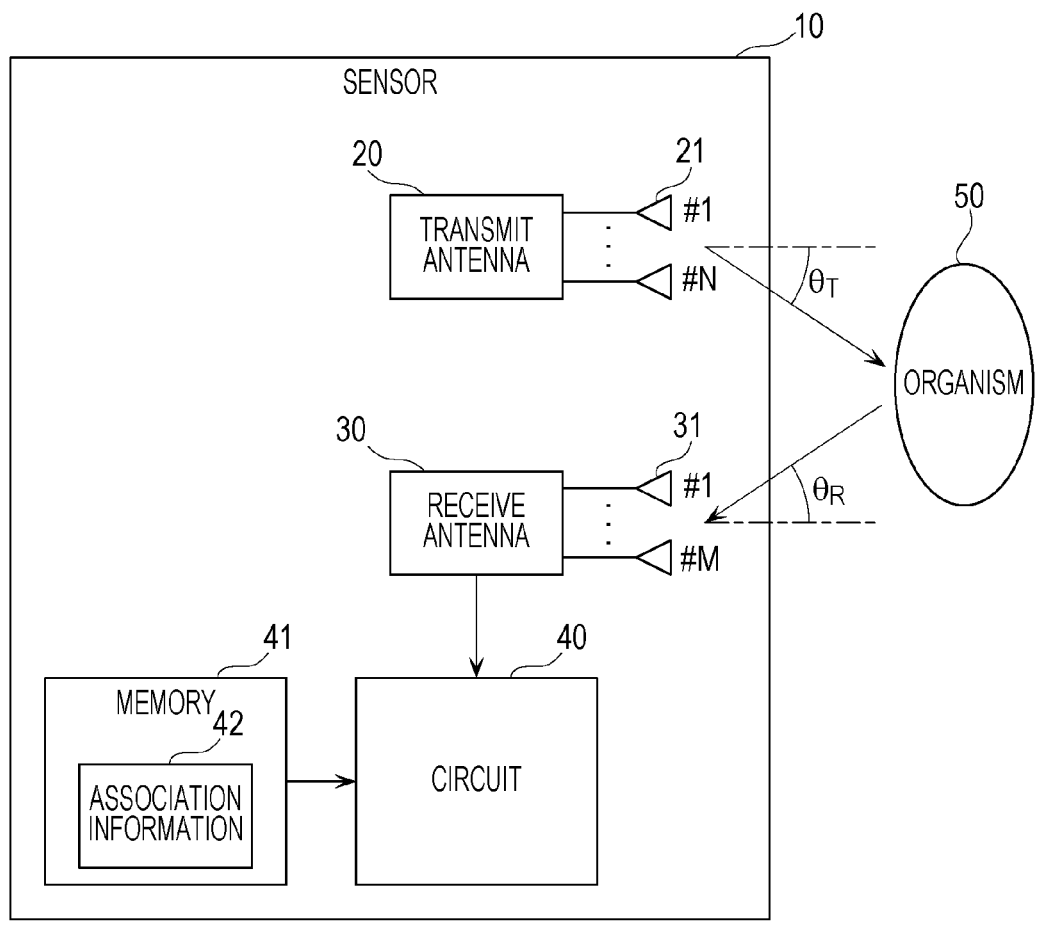
FIG. 1 is a block diagram illustrating an example of the configuration of a sensor according to a first embodiment.

DETAILED DESCRIPTION (Underlying Knowledge Forming Basis of the Present Disclosure)

The present inventors have closely examined the related art concerning the estimation of the state of an organism by using a wireless signal. The present inventors have then found that, concerning the methods disclosed in Japanese Unexamined Patent Application Publication (Translation of PCT Application) No. 2014-512526 and International Publication No. 2014/141519, although the presence or the absence of a person can be detected, it is not possible to detect the direction, position, size, and posture of a person.

Concerning the method disclosed in Japanese Unexamined Patent Application Publication No. 2015-117972, it is difficult to quickly and highly precisely detect the direction and the position in and at which an organism, for example, a person, exists. The reason for this is that a frequency change due to the Doppler effect caused by vital signs is extremely small, and to analyze such a small frequency change by utilizing Fourier transform, it is necessary to observe an organism in a motionless state for a long time (some dozens of seconds, for example). However, an organism does not usually remain in the same posture or the same position for such a long time.

Concerning the method disclosed in Japanese Unexamined Patent Application Publication No. 2014-190724, machine learning has to be conducted for each user. Concerning the method disclosed in Japanese Unexamined Patent Application Publication No. 2005-292129, the installation of plural ultrasound antennas over a wide range of the ceiling is necessary, which increases the cost.

After being committed to an extensive study of the above-described issues, the present inventors have found that it is possible to quickly and highly precisely estimate the direction, position, size, and posture of an organism by utilizing the propagation characteristics and the radar cross section of reflection signals generated as a result of signals transmitted from antenna elements of a transmit antenna being reflected by the organism. The antenna elements are disposed at different positions. As a result, the present inventors have attained the present disclosure.

(1) A sensor according to one aspect of the present disclosure is a sensor including a transmit antenna, a receive antenna, circuitry, and a memory. The transmit antenna includes N (N is a natural number of two or greater) transmit antenna elements each transmitting a transmit signal to a predetermined range within which an organism is likely to exist. The receive antenna includes M (M is a natural number of two or greater) receive antenna elements each receiving N receive signals including reflection signals generated as a result of some of the N transmit signals transmitted from the N transmit antenna elements being reflected by the organism. The circuitry calculates an N×M first matrix having complex-number transfer function components, each of the complex-number transfer function components representing propagation characteristics between a transmit antenna element and a receive antenna element, from the N receive signals received by each of the M receive antenna elements for a predetermined period. The circuitry extracts a second matrix corresponding to a predetermined frequency range from the first matrix. The second matrix represents components influenced by a vital sign including at least one of respiration, pulse, and motion of the organism. The circuitry estimates a position of the organism with respect to the sensor by using the second matrix. The circuitry calculates a first distance indicating a distance between the organism and the transmit antenna and a second distance indicating a distance between the organism and the receive antenna, based on the estimated position of the organism, a position of the transmit antenna, and a position of the receive antenna. The circuitry calculates a radar cross-section value with respect to the organism by using the first and second distances. The circuitry estimates a posture of the organism by using the calculated radar cross-section value and information indicating associations between radar cross-section values and postures of the organism stored in the memory.

It is thus possible to quickly and highly precisely estimate the position and the posture of the organism.

(2) In the above-described aspect, the predetermined period may be substantially half a period of one cycle of at least one of the respiration, pulse, and motion of the organism.

It is thus possible to effectively estimate the position and the posture of the organism.

(3) In the above-described aspect, the circuitry may estimate whether the organism is in a posture facing a direction perpendicular to a direction in which the transmit antenna and the receive antenna are arranged.

(4) In the above-described aspect, N may be a natural number of three or greater. At least three of the N transmit antenna elements may be disposed at different positions in each of vertical and horizontal directions. M may be a natural number of three or greater. At least three of the M receive antenna elements may be disposed at different positions in each of the vertical and horizontal directions. The information may indicate associations among vertical positions, radar cross-section values, and postures of the organism. The vertical positions are positions of the organism in the vertical direction with respect to the sensor. The postures of the organism associated with the vertical positions and the radar cross-section values by the information may include standing, chair sitting, cross-legged sitting, and supine postures. The circuitry may estimate three-dimensional positions of the organism including the vertical position by using the second matrix. The circuitry may estimate in which one of the standing, chair sitting, cross-legged sitting, and supine postures the organism is, by using the estimated three-dimensional positions, the calculated radar cross-section value, and the information stored in the memory.

It is thus possible to quickly and highly precisely estimate the three-dimensional positions and the posture of the organism.

The present disclosure may be implemented, not only as a device, but also as an integrated circuit including processors contained in the device, a method using the processors forming the device as steps, and a program causing a computer to execute the steps, and information, data, or a signal representing the program. The program, information, data, and signal may be recorded and distributed as a recording medium, such as a compact disc-read only memory (CD-ROM) or be distributed via a communication medium, such as the Internet.

Embodiments of the present disclosure will be described below in detail with reference to the drawings. All of the embodiments described below illustrate desirable specific examples. Numeric values, configurations, materials, components, positions and connection states of the components, steps, and the order of steps illustrated in the following embodiments are only examples, and are not described for limiting the present disclosure. Among the components illustrated in the following embodiments, the components that are not recited in the independent claims which embody the broadest concept of the present disclosure will be described as optional components forming a more desirable embodiment. In the specification and the drawings, the components having substantially the same functional configuration are designated by like reference numeral, and an explanation thereof will not be repeated.

First Embodiment

FIG. 1 is a block diagram illustrating an example of the configuration of a sensor 10 according to a first embodiment.

As shown in FIG. 1, the sensor 10 includes a transmit antenna 20, a receive antenna 30, a circuit 40, and a memory 41. The sensor 10 radiates microwaves from the transmit antenna 20 to an organism 50, for example, a person, and receives waves reflected by the organism 50 by using the receive antenna 30. The angle between a first reference direction which is set as desired with respect to the transmit antenna 20 and a first organism direction, which is a direction from the transmit antenna 20 to the organism 50, is set to be $\theta_T$. Similarly, the angle between a second reference direction which is set as desired with respect to the receive antenna 30 and a second organism direction, which is a direction from the receive antenna 30 to the organism 50, is set to be $\theta_R$. The first and second reference directions and first and second organism directions are directions on a horizontal plane.

The transmit antenna 20 includes N (N is a natural number of two or greater) transmit antenna elements 21. The N transmit antenna elements 21 are arranged on a horizontal plane in a first predetermined direction so as to form an array antenna. Each of the N transmit antenna elements 21 transmits a transmit signal to a predetermined range within which organisms may exist. That is, the transmit antenna 20 transmits N transmit signals from N different positions to the predetermined range. The predetermined range within which organisms may exist is a detection range within which the sensor 10 is able to detect the presence of organisms.

More specifically, each of the N transmit antenna elements 21 radiates microwaves to the organism 50, for example, a person, as a transmit signal. Transmit signals may have been subjected to different modulation processing before being transmitted from the N transmit antenna elements 21. Each of the N transmit antenna elements 21 may transmit a transmit signal by successively switching between a modulated signal and an unmodulated signal. Modulation processing may be performed by the transmit antenna 20, and the transmit antenna 20 may include a circuit for performing modulation processing. As a result of transmitting different transmit signals from the N transmit antenna elements 21, the antenna element 21 which has transmitted a transmit signal received by the receive antenna 30 can be specified.

The receive antenna 30 includes M (M is a natural number of two or greater) receive antenna elements 31. The M receive antenna elements 31 are arranged on a horizontal plane in a second predetermined direction so as to form an array antenna. Each of the M receive antenna elements 31 receives N receive signals including reflection signals generated as a result of some of the N transmit signals being reflected by the organism 50. The receive antenna 30 performs frequency conversion on the microwave received signals into low frequency signals, and outputs them to the circuit 40. The receive antenna 30 may include a circuit for processing received signals.

The circuit 40 executes various processing operations for operating the sensor 10. The circuit 40 is constituted by a processor which executes a control program and a volatile storage region (main storage device) used as a work area for the processor to execute the control program. The volatile storage region is a random access memory (RAM). The circuit 40 may be constituted by a dedicated circuit which executes various processing operations for operating the sensor 10. That is, the circuit 40 may be a circuit that executes software processing or a circuit that executes hardware processing.

The memory 41 is a non-volatile storage region (auxiliary storage device). Examples of the memory 41 are a read only memory (ROM), a flash memory, and a hard disk drive (HDD). The memory 41 stores information used for various processing operations for operating the sensor 10.

An example of the functional configuration of the circuit 40 will be described below with reference to FIG. 2.

Figures 2, 3:
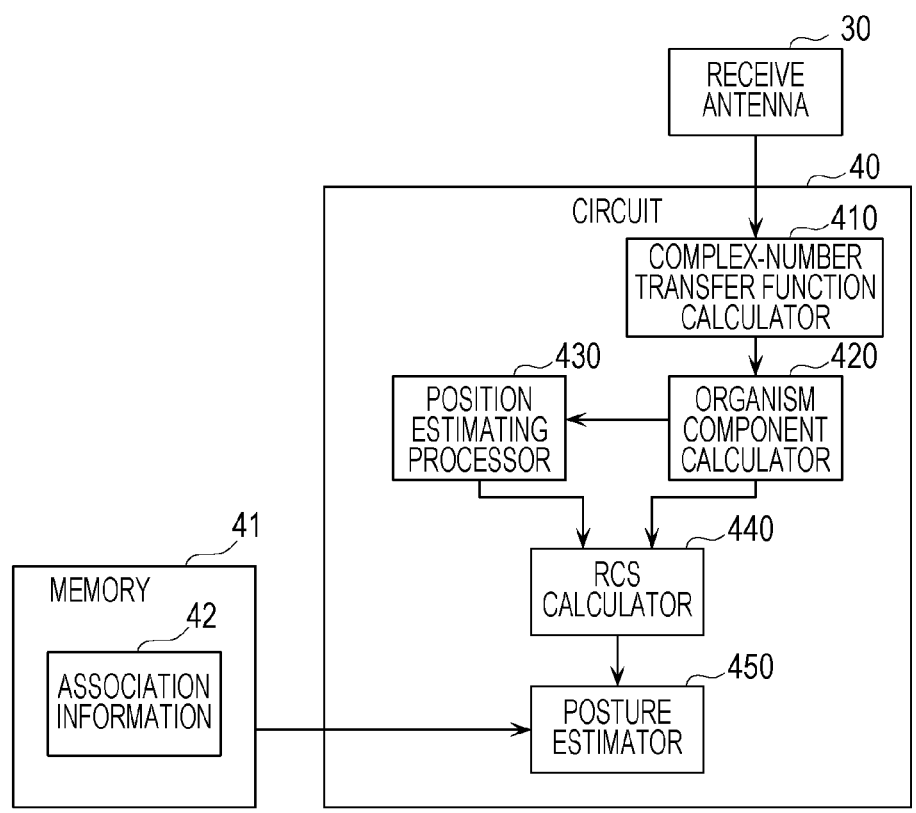
FIG. 2 is a block diagram illustrating an example of the functional configuration of a circuit and a memory according to the first embodiment.
FIG. 3 is a table illustrating information indicating the association between radar cross-section (RCS) values and postures according to the first embodiment.

FIG. 2 is a block diagram illustrating an example of the functional configuration of the circuit 40 and the memory 41 according to the first embodiment.

The circuit 40 includes a complex-number transfer function calculator 410, an organism component calculator 420, a position estimating processor 430, a radar cross-section (RCS) calculator 440, and a posture estimator 450.

The complex-number transfer function calculator 410 calculates a complex-number transfer function from low frequency signals converted from received signals. The complex-number transfer function represents path loss and phase rotation between each of the transmit antenna elements 21 and each of the receive antenna elements 31. The complex-number transfer function is a complex-number matrix having M×N components where the number of transmit antenna elements 21 is N and the number of receive antenna elements 31 is M. Hereinafter, the complex-number matrix is called a complex-number transfer function matrix. The estimated complex-number transfer function matrix is output to the organism component calculator 420. That is, the complex-number transfer function calculator 410 calculates an N×M first matrix having complex-number transfer function components, each of which represents propagation characteristics between a transmit antenna element 21 and a receive antenna element 31, from plural receive signals received by each of the M receive antenna elements 31 for a predetermined period.

The organism component calculator 420 divides the complex-number transfer function matrix into complex-number transfer function matrix components obtained from received signals originating from the organism 50 and complex-number transfer function matrix components obtained from received signals which do not originate from the organism 50. Complex-number transfer function matrix components obtained from a received signal originating from the organism 50 are components which temporally change due to the vital signs of the organism 50. Such components may be extracted by removing direct current (DC) components from components obtained by performing Fourier transform on the complex-number transfer function matrix components on a time domain, assuming that objects other than the organism 50 are still. Hereinafter, complex-number transfer function matrix components obtained from a received signal originating from the organism 50 may also be simply called components originating from the organism 50. Such components may also be extracted in the following manner. Differences between complex-number transfer function matrix components and those when the organism 50 does not exist within a predetermined range are obtained. Then, components having a difference exceeding a predetermined threshold are selected as components originating from the organism 50. In this manner, the organism component calculator 420 calculates organism components as a result of extracting complex-number transfer function matrix components obtained from received signals including reflection signals originating from the organism 50. That is, the organism component calculator 420 extracts a second matrix corresponding to a predetermined frequency range in the first matrix from the first matrix. The second matrix represents components influenced by vital signs including at least one of the respiration, pulse, and motion of an organism. The predetermined frequency range includes frequencies originating from vital signs including at least one of the respiration, pulse, and motion of an organism. The predetermined frequency range is a range of 0.1 to 3 Hz, for example. More specifically, the organism component calculator 420 can extract organism components influenced by vital signs of a part of the organism 50 due to the motion of organs such as the heart, lungs, and diaphragm, or organism components influenced by vital signs of hands and legs. The part of the organism 50 is the solar plexus, for example.

Organism components are represented by a matrix of M×N components, and are extracted from a complex-number transfer function obtained from signals received by the receive antenna 30 for a predetermined period. Organism components have frequency response information or time response information. The predetermined period is substantially half the period of one cycle of at least one of the respiration, pulse, and motion of an organism.

The organism components calculated by the organism component calculator 420 are output to the position estimating processor 430. The position estimating processor 430 estimates the position of an organism by using the calculated organism components. That is, the position estimating processor 430 estimates the position of the organism 50 with respect to the sensor 10 by using the second matrix. More specifically, the position estimating processor 430 estimates the departure angle $\theta_T$ from the transmit antenna 20 to the organism 50 and the arrival angle $\theta_R$ from the organism 50 to the receive antenna 30 so as to estimate the position of the organism 50 from the departure angle $\theta_T$ and the arrival angle $\theta_R$ by using trigonometry.

The RCS calculator 440 calculates the radar cross section by using the organism components and the estimated position of the organism 50. More specifically, to calculate the radar cross section, the RCS calculator 440 calculates the distance RT indicating the distance between the organism 50 and the transmit antenna 20 and the distance RR indicating the distance between the organism 50 and the receive antenna 30, based on the estimated position of the organism 50, the position of the transmit antenna 20, and the position of the receive antenna 30. The RCS calculator 440 calculates the propagation distance from the calculated distances RT and RR, and calculates the RCS value by using the calculated propagation distance and the intensity of the organism components. The positions of the transmit antenna 20 and the receive antenna 30 may be stored in the memory 41 in advance.

The posture estimator 450 estimates the posture of the organism 50 by using the RCS value calculated by the RCS calculator 440 and association information 42 indicating the association between the RCS values and the postures of the organism 50 stored in the memory 41. The association information 42 is information concerning the ranges of RCS values associated with postures such as supine, cross-legged sitting, chair sitting, and standing postures, as shown in FIG. 3. Supine is a posture in which a person is lying on one's back. Chair sitting is a posture in which a person is sitting on a chair. Cross-legged sitting is a posture in which a person is sitting cross-legged.

Supine corresponds to a first RCS range, cross-legged sitting corresponds to a second RCS range, chair sitting corresponds to a third RCS range, and standing corresponds to a fourth RCS range. The RCS values of the first through fourth RCS ranges are different from each other.

Details of the operation principle of the sensor 10 according to the first embodiment will be discussed below by using mathematical equations. Extracting of organism components by using Fourier transform will first be discussed. The following processing is executed by the circuit 40. The complex-number transfer function matrix between the transmit antenna 20 and the receive antenna 30 is defined as in equation (1):

$$H(t) = \begin{pmatrix} h_{11}(t) & \cdots & h_{1N}(t) \\ \vdots & \ddots & \vdots \\ h_{M1}(t) & \cdots & h_{MN}(t) \end{pmatrix} \quad (1)$$

where t denotes the time. By performing Fourier transform on the components in equation (1), the frequency response matrix expressed by equation (2) is obtained:

$$G(f) = \begin{pmatrix} g_{11}(f) & \cdots & g_{1N}(f) \\ \vdots & \ddots & \vdots \\ g_{M1}(f) & \cdots & g_{MN}(f) \end{pmatrix} \quad (2)$$

where f denotes the frequency. The components of the frequency response matrix are complex numbers. This frequency response matrix contains both of the propagation components originating from the organism 50 and the propagation components originating from objects other than the organism 50. Assuming that the objects other than the organism 50 are still, DC components in the frequency response matrix, that is, G(0), is likely to contain the propagation components originating from the objects other than the organism 50. The reason for this is that the components originating from the organism 50 are likely to be contained in components other than f=0 because the Doppler shift occurs by vital signs including at least one of the respiration, pulse, and motion of an organism. Considering the frequencies of the respiration or pulse of the organism 50 and higher harmonics thereof, components originating from the organism 50 are likely to be largely contained in an f<3 [Hz] range. Thus, extracting of G(f) in a predetermined frequency range, for example, 0 [Hz]<f<3 [Hz], makes it possible to effectively extract organism components.

Then, estimating of the position of an organism by using organism components G(f) will be discussed. The organism component matrix G(f) is rearranged into a vector format as in equation (3).

$$g(f) = [g_{11}(t), \ldots, g_{M1}(t), g_{12}(t), \ldots, g_{N2}(t), \ldots, g_{1M}(t), \ldots, g_{NM}(t)]^T \quad (3)$$

This vector format is defined as an organism component vector. In equation (3), $\{\bullet\}^T$ represents transpose. From the organism component vector g(f), a correlation matrix R is calculated according to equation (4):

$$R = \sqrt{g(f)g(f)^H} \quad (4)$$

where $\{\bullet\}^H$ is complex conjugate transpose. In equation (4), R is averaged in a range of 0 [Hz]<f<3 [Hz]. It is known that averaging of R improves the position estimating precision, which will be discussed later. Then, the correlation matrix R is subjected to eigenvalue decomposition so as to calculate the eigenvector U and its complex conjugate transpose vector $U^H$ according to equation (5).

$$R = UDU^H \quad (5)$$

The eigenvector U in equation (5) can be expressed by equation (6):

$$U = [u_1, \ldots, u_{MN}] \quad (6)$$

where $u_i$ is the eigenvector in the i-th row. The number of vector elements is NM. D in equation (5) is a diagonal matrix in which diagonal elements are eigenvalues, and is expressed by equation (7):

$$D = \text{diag}[\lambda_1, \ldots, \lambda_{MN}] \quad (7)$$

where diag[•] is a diagonal matrix having elements within [•] in a diagonal term. The circuit 40 estimates the position of the organism 50 (detection object) by using the above-described items of information. Estimating of the position of the organism 50 based on the MUSIC (MUltiple SIgnal Classification) algorithm will be discussed below. The MUSIC algorithm is an algorithm for estimating the direction or the position of an object by using a direction vector called the steering vector and the eigenvector expressed by equation (6). The organism component vector expressed by equation (3) can be found by modifying the original M×N matrix. To estimate the position of the organism 50, it is necessary to define the steering vector. The steering vector in the first organism direction having the departure angle $\theta_T$ from the first reference direction of the transmit antenna 20 is expressed by equation (8). The steering vector in the second organism direction having the arrival angle $\theta_R$ from the second reference direction of the receive antenna 30 is expressed by equation (9).

$$a_T(\theta_T) = [1, e^{-jkd \sin \theta_T}, \ldots, e^{-jkd(N-1)\sin \theta_T}]^T \quad (8)$$

$$a_R(\theta_R) = [1, e^{-jkd \sin \theta_R}, \ldots, e^{-jkd(M-1)\sin \theta_R}]^T \quad (9)$$

In equations (8) and (9), k is the wavenumber, and d is the element interval between antenna elements of an antenna array. In the first embodiment, the use of a linear array antenna having a constant element interval is assumed. In the transmit antenna 20, d is the interval between two adjacent transmit antenna elements 21 among the plural transmit antenna elements 21. In the receive antenna 30, d is the interval between two adjacent receive antenna elements 31 among the plural receive antenna elements 31. The Kronecker product of these steering vectors is found by equation (10):

$$a(\theta_T, \theta_R) = a_T(\theta_T) \otimes a_R(\theta_R) \quad (10)$$

where ⊗ is an operator representing the Kronecker product. In equation (10), $a(\theta_T, \theta_R)$ is a vector having MN×1 elements and is a function having two variables of the departure angle $\theta_T$ and the arrival angle $\theta_R$. Hereinafter, $a(\theta_T, \theta_R)$ is defined as the steering vector. When the number of organisms within the detection range is indicated by L, the position of the organism 50 is specified by the evaluation function expressed by equation (11).

$$P(\theta_T, \theta_R) = \frac{\alpha^H(\theta_T, \theta_R)\alpha(\theta_T, \theta_R)}{\alpha^H(\theta_T, \theta_R)[u_{L+1}, \ldots, u_{MN}][u_{L+1}, \ldots, u_{MN}]^H \alpha(\theta_T, \theta_R)} \quad (11)$$

The evaluation function expressed by equation (11) is called the MUSIC spectrum, and takes the maximal value in a combination $(\theta_T, \theta_R)$ of the direction from the transmit antenna 20 to the organism 50 (detection object) and the direction from the receive antenna 30 to the organism 50. Based on $\theta_T$ and $\theta_R$ corresponding to the maximal values, the position of the organism 50 can be specified by using trigonometry. In equation (11), L is the number of detection objects. That is, it is necessary that the number MN of eigenvectors be greater than the number L of detection objects.

Then, the RCS value is found from equation (12), and the posture of the organism 50 is estimated from the position of the organism 50 and the RCS value. If the above-described predetermined frequency range to be extracted is f1 to f2 (f1<f2), the power transfer coefficient is found from channel components reflected by and observed from the organism 50 according to equation (12).

$$\rho_{ij} = \int_{f_1}^{f_2} |g_{ij}(f)|^2 df \quad (12)$$

In equation (12), $\rho_{ij}$ denotes the (i, j)-th element of the matrix expressed by equation (13).

$$\rho = \begin{bmatrix} \rho_{11} & \cdots & \rho_{1N} \\ \vdots & \ddots & \vdots \\ \rho_{M1} & \cdots & \rho_{MN} \end{bmatrix} \quad (13)$$

Power transmitted from the j-th transmit antenna element 21 and reaching the i-th receive antenna element 31 via the organism 50 is expressed by equation (14).

$$P_{rij} = \frac{P_t G_t G_r \sigma_{ij} \lambda^2}{(4\pi)^3 R_1^2 R_2^2} \quad (14)$$

In equation (14), Pt denotes the transmission power. It is assumed that the same level of power is transmitted from all the transmit antenna elements 21. In equation (14), Gt is the operation gain of the transmit antenna 20, Gr is the operation gain of the receive antenna 30, r1 is the distance from the transmit antenna 20 to the organism 50, and r2 is the distance from the organism 50 to the receive antenna 30. The distances r1 and r2 can easily be calculated from the position estimated from equation (11). Then, the power transfer coefficient defined by equation (12) is represented by $\rho_{ij}=P_{rij}/P_t$, and the radar cross section can be calculated by equation (15).

$$\sigma_{ij} = \frac{P_{rij}(4\pi)^3 R_1^2 R_2^2}{P_t G_t G_r \lambda^2} \quad (15)$$

The radar cross section expressed by equation (15) is not the radar cross section of the entire organism 50, but the radar cross section corresponding to variation components generated by the influence of vital signs such as the respiration, pulse, and motion of the organism 50. By averaging all the elements in the radar cross section expressed by equation (15), the average radar cross section is found by equation (16).

$$\bar{\sigma} = \frac{1}{MN} \sum_{i=1}^{M} \sum_{j=1}^{N} \sigma_{ij} \quad (16)$$

Hereinafter, $\bar{\sigma}$ is simply called the radar cross section.

If the radar cross section is calculated by separating the vital signs of the organism 50 into the vital components and the motion components, the predetermined frequency range in equation (12) is adjusted, and then, calculations are carried out in a similar manner.

The operation of the sensor 10 according to the first embodiment will be described below by using a flowchart.

Figure 4:
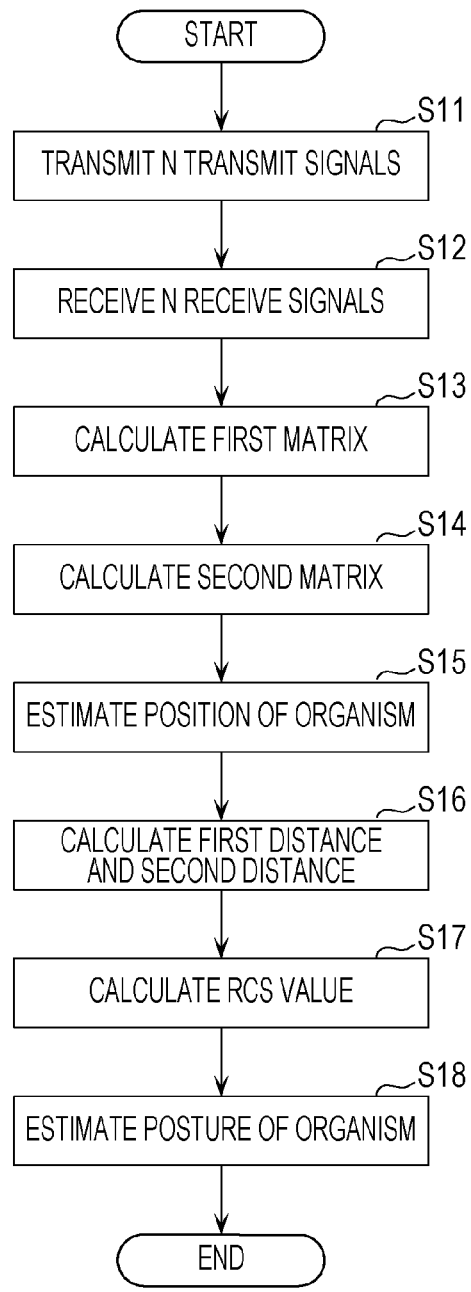
FIG. 4 is a flowchart illustrating an example of the operation of the sensor according to the first embodiment.

FIG. 4 is a flowchart illustrating an example of the operation of the sensor 10 according to the first embodiment.

In step S11, in the sensor 10, the N transmit antenna elements 21 of the transmit antenna 20 transmit N transmit signals to a predetermined range within which the organism 50 may exist.

In step S12, each of the M receive antenna elements 31 of the receive antenna 30 receives N receive signals including plural reflection signals generated as a result of some of the N transmit signals being reflected by the organism 50.

In step S13, the circuit 40 calculates an N×M first matrix having complex-number transfer function components, each of which represents propagation characteristics between a transmit antenna element 21 and a receive antenna element 31, from the N receive signals received by each of the M receive antenna elements 31 for a predetermined period.

In step S14, the circuit 40 extracts a second matrix corresponding to the predetermined frequency range in the first matrix from the first matrix. The second matrix represents components influenced by vital signs including at least one of the respiration, pulse, and motion of the organism 50.

In step S15, the circuit 40 estimates the position of the organism 50 with respect to the sensor 10 by using the second matrix.

In step S16, the circuit 40 calculates the distance r1 between the organism 50 and the transmit antenna 20 and the distance r2 between the organism 50 and the receive antenna 30, based on the estimated position of the organism 50, the position of the transmit antenna 20, and the position of the receive antenna 30.

In step S17, the circuit 40 calculates the RCS value of the organism 50 by using the first distance r1 and the second distance r2.

In step S18, the circuit 40 estimates the posture of the organism 50 by using the calculated RCS value and the association information 42 indicating the association between the RCS values and the postures of the organism 50 stored in the memory 41.

By using the sensor 10 according to the first embodiment, it is possible to quickly and highly precisely estimate the position and the posture of the organism 50.

The sensor 10 detects the presence of the organism 50 by finding a moving part of the organism 50. By using this function of the sensor 10, it is possible to detect whether a person is alive and to estimate whether this person is standing, sitting in a chair, sitting cross-legged, or in a supine posture. This makes it possible to effectively check whether a person is alive. Additionally, this can be performed without the need to analyze an image captured by a camera. Thus, privacy protection is not violated.

Second Embodiment

Figure 5:
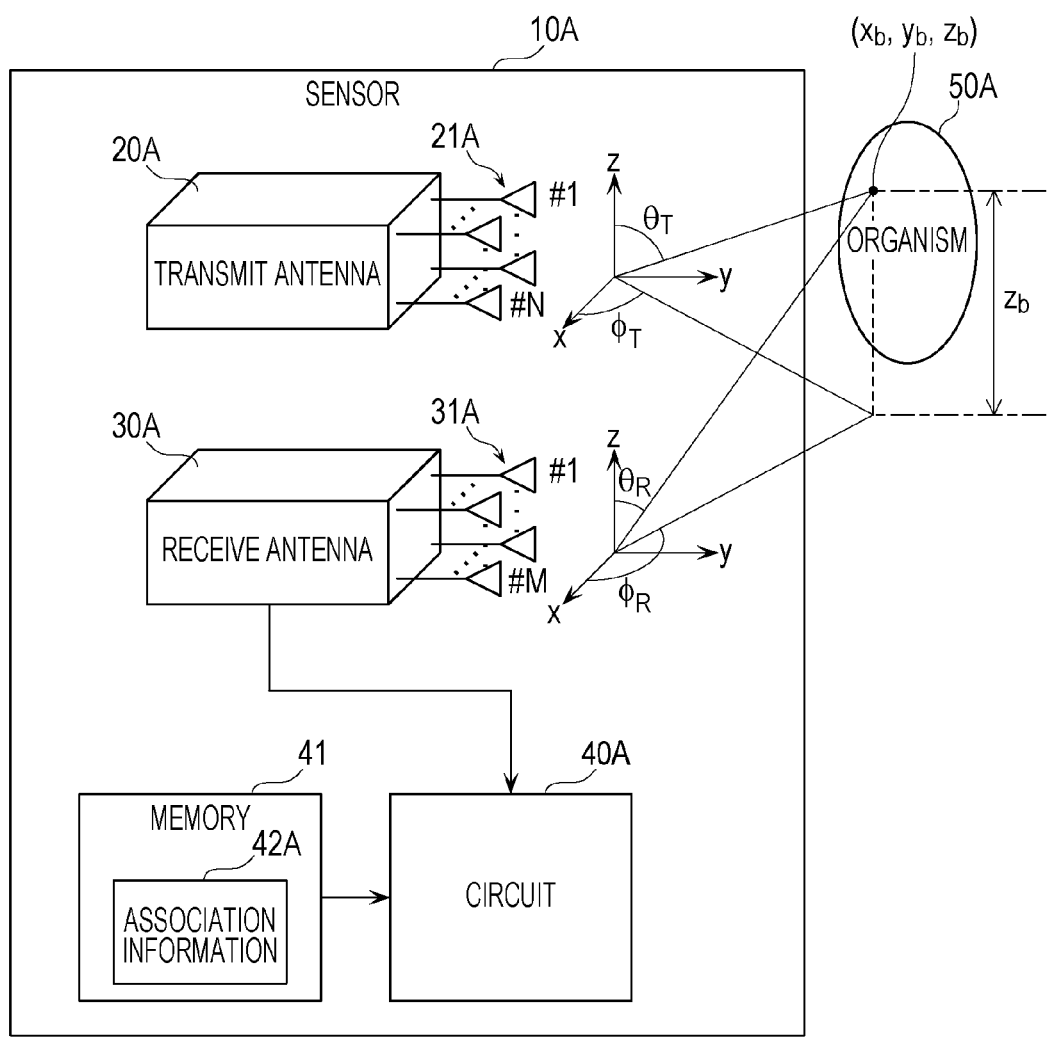
FIG. 5 is a block diagram illustrating an example of the configuration of a sensor according to a second embodiment.

FIG. 5 is a block diagram illustrating an example of the configuration of a sensor 10A according to a second embodiment. FIG. 6 is a block diagram illustrating an example of the functional configuration of a circuit 40A and a memory 41 according to the second embodiment.

The sensor 10A of the second embodiment is different from the sensor 10 of the first embodiment in the following points. N transmit antenna elements 21A of a transmit antenna 20A and M receive antenna elements 31A of a receive antenna 30A are arranged in a different manner from the transmit antenna elements 21 and the receive antenna elements 31 of the first embodiment. In the second embodiment, N and M are a natural number of three or greater.

The transmit antenna 20A is an array antenna constituted by N ($N=N_X \times N_Z$) transmit antenna elements 21A. More specifically, $N_X$ transmit antenna elements 21A are arranged in the horizontal direction (x direction) and $N_Z$ transmit antenna elements 21A are arranged in the vertical direction (z direction). That is, at least three of the N transmit antenna elements 21A are disposed at different positions in each of the vertical and horizontal directions.

The receive antenna 30A is an array antenna constituted by M ($M=M_X \times M_Z$) receive antenna elements 31A. More specifically, $M_X$ receive antenna elements 31A are arranged in the horizontal direction (x direction) and $M_Z$ receive antenna elements 31A are arranged in the vertical direction (z direction). That is, at least three of the M receive antenna elements 31A are disposed at different positions in each of the vertical and horizontal directions.

The angle between a first reference direction, which is a direction on a horizontal plane, set as desired with respect to the transmit antenna 20A and a first organism direction, which is a direction from the transmit antenna 20A to an organism 50A, is set to be $\phi_T$. The elevation angle of the organism 50A between the vertical direction and the first organism direction is set to be $\theta_T$. The elevation angle between a second reference direction, which is a direction on a horizontal plane, set as desired with respect to the receive antenna 30A and a second organism direction, which is a direction from the receive antenna 30A to the organism 50A, is set to be $\phi_R$. The angle of the organism 50A between the vertical direction and the second organism direction is set to be $\theta_R$. When the center coordinates of a part of the organism 50A that transmits vital signs is ($x_b$, $y_b$, $z_b$), the directions ($\theta_T$, $\theta_R$, $\phi_T$, $\phi_R$) and the coordinates ($x_b$, $y_b$, $z_b$) are mutually transformable in accordance with the positional relationships among the transmit antenna 20A, the receive antenna 30A, and the organism 50A.

Processing executed by the circuit 40A is also different from that of the circuit 40 of the sensor 10. The organism 50A transmits the stronger vital signs in the height direction $z_b$ than the surrounding objects do. The organism 50A has an abdomen, for example, the surface of which is displaced by the respiration by a greater amount than the other parts. The sensor 10A estimates three-dimensional positions of the organism 50 including the height, which is the vertical position zb (position in the z-axis direction), of the abdomen of the organism 50A, in addition to the position of the organism 50 on a horizontal plane estimated by the sensor 10 of the first embodiment. That is, instead of the position estimating processor 430 of the circuit 40 of the first embodiment, the circuit 40A of the sensor 10A includes a three-dimensional position estimating processor 430A that estimates the three-dimensional positions of the organism 50A.

Association information 42A stored in the memory 41 of the sensor 10A is also different from the association information 42 stored in the memory 41 of the sensor 10. In the second embodiment, the association information 42A stored in the memory 41 indicates the ranges of RCS values and the ranges of the height associated with postures such as supine, cross-legged sitting, chair sitting, and standing postures, as shown in FIG. 7. For example, supine corresponds to a first RCS range and a first height range, cross-legged sitting corresponds to a second RCS range and a second height range, chair sitting corresponds to a third RCS range and a third height range, and standing corresponds to a fourth RCS range and a fourth height range. The RCS values of the first through fourth RCS ranges are different from each other. The values of the first through fourth height ranges are different from each other.

The configurations of the other elements of the sensor 10A are the same as those of the sensor 10. They are thus designated by like reference numerals, and an explanation thereof will be omitted.

The sensor 10A estimates a vertical position, which is the position of the organism 50 in the vertical direction, in addition to the position of the organism 50 on a horizontal plane estimated by the sensor 10 of the first embodiment.

Details of the operation principle of the sensor 10A according to the second embodiment will be discussed below by using mathematical equations. Processing is executed similarly to the first embodiment by using equations (1) through (4). A correlation matrix R is calculated from the organism components according to equation (4):

$$R = \overline{g(f)g(f)^H} \quad (4)$$

As in the first embodiment, R is averaged in a range of 0 [Hz]<f<3 [Hz].

Then, the correlation matrix R calculated by using equation (5) is subjected to eigenvalue decomposition so as to calculate the eigenvector U and the diagonal matrix D as follows.

$$U = [u_1, \ldots, u_{MN}] \quad (6)$$

$$D = \text{diag}[\lambda_1, \ldots, \lambda_{MN}] \quad (7)$$

Estimating of the position of the organism 50A including the height direction based on the MUSIC algorithm will be discussed below. The steering vector indicating a direction $(\theta_T, \phi_T)$ from the transmit antenna 20A to the organism 50A is expressed by equation (17). The steering vector indicating a direction $(\theta_R, \phi_R)$ from the receive antenna 30A to the organism 50A is expressed by equation (18).

$$a_T(\theta_T, \phi_T) = \\ [e^{-j\phi_{T(1,1)}}, \ldots, e^{-j\phi_{T(N_x,1)}}, \ldots, e^{-j\phi_{T(1,N_z)}}, \ldots, e^{-j\phi_{T(N_x,N_z)}}]^T \quad (17)$$

$$a_R(\theta_R, \phi_R) = \\ [e^{-j\phi_{R(1,1)}}, \ldots, e^{-j\phi_{R(M_x,1)}}, \ldots, e^{-j\phi_{R(1,M_z)}}, \ldots, e^{-j\phi_{R(M_x,M_z)}}]^T \quad (18)$$

The following equations (19) and (20) hold true from equations (17) and (18), respectively.

$$\Phi_{T(i_x,i_z)} = k\{d_{Tx}(i_x - 1)\sin\theta_T\cos\phi_T + d_{Tz}(i_z - 1)\cos\theta_T\} \quad (19)$$

$$\begin{cases} 1 \le i_x \le N_x \\ 1 \le i_z \le N_z \end{cases}$$

$$\Phi_{R(i_x,i_z)} = k\{d_{Rx}(j_x - 1)\sin\theta_R\cos\phi_R + d_{Rz}(j_z - 1)\cos\theta_R\} \quad (20)$$

$$\begin{cases} 1 \le j_x \le M_x \\ 1 \le j_z \le M_z \end{cases}$$

In equations (19) and (20), k is the wavenumber. In equation (19), $d_{Tx}$ and $d_{Tz}$ are the element interval between the transmit antenna elements 21A in the x direction and the z direction, respectively. In equation (20), $d_{Rx}$ and $d_{Rz}$ are the element interval between the receive antenna elements 31A in the x direction and the z direction, respectively. In the second embodiment, the use of a linear array antenna having a constant element interval in the same direction is assumed.

In the transmit antenna 20A, $d_{Tx}$ is the interval between two adjacent transmit antenna elements 21A in the x direction among the plural transmit antenna elements 21A, and $d_{Tz}$ is the interval between two adjacent transmit antenna elements 21A in the z direction among the plural transmit antenna elements 21A. In the receive antenna 30A, $d_{Rx}$ is the interval between two adjacent receive antenna elements 31A in the x direction among the plural receive antenna elements 31A, and $d_{Rz}$ is the interval between two adjacent receive antenna elements 31A in the z direction among the plural receive antenna elements 31A. The Kronecker product of these steering vectors is found by equation (21).

$$a(\theta_T,\phi_T,\theta_R,\phi_R) = a_T(\theta_T,\phi_T) \otimes a_R(\theta_R,\phi_R) \quad (21)$$

In equation (21), $a(\theta_T, \phi_T, \theta_R, \phi_R)$ is a vector having MN×1 elements and is a function having four variables of the departure angles $\theta_T$ and $\phi_T$ and the arrival angles $\theta_R$ and $\phi_R$. Hereinafter, $a(\theta_T, \phi_T, \theta_R, \phi_R)$ is defined as the steering vector. When the number of organisms within the detection range is indicated by L, the position of the organism 50A is specified by the evaluation function expressed by equation (22).

$$P(\theta_T, \phi_T, \theta_R, \phi_R) = \frac{\alpha^H(\theta_T, \phi_T, \theta_R, \phi_R)\alpha(\theta_T, \phi_T, \theta_R, \phi_R)}{\alpha^H(\theta_T, \phi_T, \theta_R, \phi_R)[u_{L+1}, \ldots, u_{MN}][u_{L+1}, \ldots, u_{MN}]^H \alpha(\theta_T, \phi_T, \theta_R, \phi_R)} \quad (22)$$

In a manner similar to the first embodiment, by searching for the maximal point of the MUSIC spectrum expressed by equation (22), the three-dimensional positions of the organism 50A including the vertical position as viewed from the transmit antenna 20A and the receive antenna 30A can be specified.

The operation of the sensor 10A according to the second embodiment can be explained by using the flowchart of FIG. 4 by replacing the estimating of the position of the organism 50 in step S15 by the estimating of the three-dimensional positions of the organism 50A, and an explanation thereof will thus be omitted.

Figure 8:
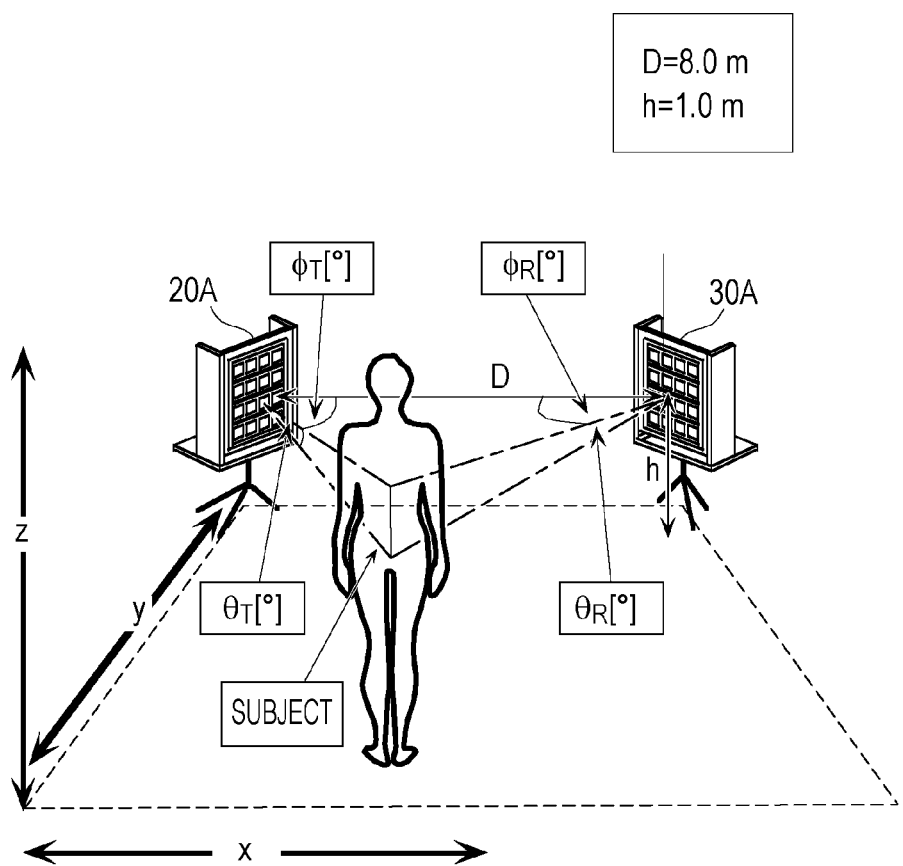
FIG. 8 illustrates an overview of an experiment conducted for checking the effects of the sensor according to the second embodiment.

FIG. 8 illustrates an overview of an experiment conducted for checking the effects of the sensor 10A according to the second embodiment.

As shown in FIG. 8, the transmit antenna 20A is a square array antenna constituted by sixteen transmit antenna elements 21A (4×4=16). The transmit antenna elements 21A are patch antennas. The receive antenna 30A is a square array antenna constituted by sixteen receive antenna elements 31A (4×4=16). The receive antenna elements 31A are also patch antennas. The element interval between the transmit antenna elements 21A and that between the receive antenna elements 31A are both 0.5 wavelength.

The subject participated in this experiment is one. The state of the subject was measured as one of the four states of standing, chair sitting, cross-legged sitting, and supine (lying on one's back). The position of the subject was (X, Y)=(5.0, 1.0) m. The subject was facing the direction toward the transmit antenna 20A and the receive antenna 30A (Y direction), except when the subject was in the supine posture. When the subject was in the supine posture, the feet of the subject were facing the direction toward the transmit antenna 20A and the receive antenna 30A (Y direction). The state of the subject was examined for about five seconds per each cycle of the experiment.

FIG. 9 is a graph illustrating the experiment results obtained by using the experimental system shown in FIG. 8. In FIG. 9, the horizontal axis indicates the estimated height zb, and the vertical axis indicates the calculated radar cross section (RCS).

FIG. 9 shows that the distribution area of the height and that of the RCS value are different according to the posture. That is, it is validated that the posture of the subject can be estimated from the estimated height and the calculated RCS value. The association information 42A indicating the association between the RCS values and the heights and the postures is set, as shown in FIG. 10, for example. Then, by using the estimated three-dimensional positions, the calculated RCS value, and the association information 42A stored in the memory 42, it is possible to estimate the posture of the organism 50A, that is, in which one of the four postures, standing, chair sitting, cross-legged sitting, and supine, the organism 50A is. FIG. 10 is a table indicating specific examples of the first through fourth RCS ranges and the first through fourth heights obtained from the experiment results. The specific examples of the first through fourth RCS ranges shown in FIG. 10 may be used for those of the association information 42 in the first embodiment shown in FIG. 3.

By using the sensor 10A according to the second embodiment, it is possible to quickly and highly precisely estimate the three-dimensional positions and the posture of the organism 50A.

In the above-described first and second embodiments, the individual elements may be implemented by dedicated hardware or by executing a software program suitable for the elements. The elements may be implemented as a result of a central processing unit (CPU) or a program executing unit such as a processor reading and executing a software program recorded on a recording medium, such as a hard disk or a semiconductor memory. A software program implementing the sensors 10 and 10A of the first and second embodiments is the following program, for example.

The program causes a computer to execute an estimating method for a sensor including a transmit antenna having N transmit antenna elements, N being a natural number of two or greater, a receive antenna including M receive antenna elements, M being a natural number of two or greater, circuitry, and a memory. The estimating method includes: transmitting a transmit signal to a predetermined range within which an organism is likely to exist by using the N transmit antenna elements; receiving N receive signals by using each of the M receive antenna elements, the N receive signals including reflection signals generated as a result of some of the transmitted N transmit signals being reflected by the organism; calculating an N×M first matrix having complex-number transfer function components, each of the complex-number transfer function components representing propagation characteristics between a transmit antenna element and a receive antenna element, from the N receive signals received by each of the M receive antenna elements for a predetermined period; extracting a second matrix corresponding to a predetermined frequency range from the first matrix, the second matrix representing components influenced by a vital sign including at least one of respiration, pulse, and motion of the organism; estimating a position of the organism with respect to the sensor by using the second matrix; calculating a first distance indicating a distance between the organism and the transmit antenna and a second distance indicating a distance between the organism and the receive antenna, based on the estimated position of the organism, a position of the transmit antenna, and a position of the receive antenna; calculating a radar cross-section value with respect to the organism by using the first and second distances; and estimating a posture of the organism by using the calculated radar cross-section value and information indicating associations between radar cross-section values and postures of the organism stored in the memory.

The sensors 10 and 10A according to one or plural aspects of the present disclosure have been discussed through illustration of the first and second embodiments. However, the present disclosure is not restricted to these embodiments. Various modifications apparent to those skilled in the art may be made to the first and second embodiments without departing from the scope and spirit of the disclosure. The elements in the first and second embodiments may be combined to realize other embodiments. Such modifications and embodiments may also be encompassed within one or plural aspects of the present disclosure.

In the above-described embodiments, the sensors 10 and 10A estimate the posture of an organism, that is, in which one of the four postures, standing, chair sitting, cross-legged sitting, and supine, the organism is. However, the postures of an organism estimated by the sensors 10 and 10A are not restricted to these postures. For example, the sensors 10 and 10A may estimate whether an organism is in a posture facing a direction perpendicular to the direction in which the transmit antennas 20 and 20A and the receive antennas 30 and 30A are arranged. More specifically, the sensors 10 and 10A may estimate whether an organism is in a posture facing the y direction in FIG. 1 or 5 or a direction substantially perpendicular to the y direction. When a person is facing the y direction, the RCS value is smaller than that when the person is not facing the y direction. The posture in which a person is facing a direction substantially perpendicular to the y direction is a posture in which the person is facing the x direction.

In the first embodiment, the N transmit antenna elements 21 are arranged in the first predetermined direction on a horizontal plane, while the M receive antenna elements 31 are arranged in the second predetermined direction on a horizontal plane. However, the arrangement of the transmit antenna elements 21 and the receive antenna elements 31 is not restricted to this configuration. That is, the first and second predetermined directions are not limited to directions on a horizontal plane, and may be directions on a plane including a vertical direction or directions on a plane tilting from a horizontal plane. In this case, the circuit 40 estimates the position of an organism on a plane including the first and second predetermined directions.

The present disclosure is applicable to a sensor and an estimating method for estimating the direction and the position of a moving body by using a wireless signal. In particular, the present disclosure is applicable to a direction estimating device using a radar cross section and a position estimating device installed in measuring instrument for measuring the directions and the positions of moving bodies including organisms and machines, household appliances for performing control in accordance with the direction and the position of a moving object, and monitoring equipment for monitoring intrusion of moving bodies, and to a direction estimating method and a position estimating method.

What is claimed is:
1. A sensor comprising:
 a transmit antenna including N transmit antenna elements, each of the N transmit antenna elements transmitting a transmit signal to a predetermined range within which an organism is likely to exist, N being a natural number of two or greater;

a receive antenna including M receive antenna elements, each of the M receive antenna elements receiving N receive signals including reflection signals generated as a result of some of the N transmit signals transmitted from the N transmit antenna elements being reflected by the organism, M being a natural number of two or greater;

circuitry; and a memory, wherein the circuitry calculates an N×M first matrix having complex-number transfer function components, each of the complex-number transfer function components representing propagation characteristics between a transmit antenna element and a receive antenna element, from the N receive signals received by each of the M receive antenna elements for a predetermined period, the circuitry extracts a second matrix corresponding to a predetermined frequency range from the first matrix, the second matrix representing components influenced by a vital sign including at least one of respiration, pulse, and motion of the organism, the circuitry estimates a position of the organism with respect to the sensor by using the second matrix, the circuitry calculates a first distance indicating a distance between the organism and the transmit antenna and a second distance indicating a distance between the organism and the receive antenna, based on the estimated position of the organism, a position of the transmit antenna, and a position of the receive antenna, the circuitry calculates a radar cross-section value with respect to the organism by using the first and second distances, and the circuitry estimates a posture of the organism by using the calculated radar cross-section value and information indicating associations between radar cross-section values and postures of the organism stored in the memory.

2. The sensor according to claim 1, wherein the predetermined period is substantially half a period of one cycle of at least one of the respiration, pulse, and motion of the organism.

3. The sensor according to claim 1, wherein the circuitry estimates whether the organism is in a posture facing a direction perpendicular to a direction in which the transmit antenna and the receive antenna are arranged.

4. The sensor according to claim 1, wherein:
N is a natural number of three or greater;
at least three of the N transmit antenna elements are disposed at different positions in each of vertical and horizontal directions;
M is a natural number of three or greater;
at least three of the M receive antenna elements are disposed at different positions in each of the vertical and horizontal directions;
the information indicates associations among vertical positions, radar cross-section values, and postures of the organism, the vertical positions being positions of the organism in the vertical direction with respect to the sensor;
the postures of the organism associated with the vertical positions and the radar cross-section values by the information include standing, chair sitting, cross-legged sitting, and supine postures;
the circuitry estimates three-dimensional positions of the organism including the vertical position by using the second matrix; and
the circuitry estimates in which one of the standing, chair sitting, cross-legged sitting, and supine postures the organism is, by using the estimated three-dimensional positions, the calculated radar cross-section value, and the information stored in the memory.

5. An estimating method for a sensor including a transmit antenna having N transmit antenna elements, N being a natural number of two or greater, a receive antenna including M receive antenna elements, M being a natural number of two or greater, circuitry, and a memory, the estimating method comprising:
transmitting a transmit signal to a predetermined range within which an organism is likely to exist by using the N transmit antenna elements;
receiving N receive signals by using each of the M receive antenna elements, the N receive signals including reflection signals generated as a result of some of the transmitted N transmit signals being reflected by the organism;
calculating an N×M first matrix having complex-number transfer function components, each of the complex-number transfer function components representing propagation characteristics between a transmit antenna element and a receive antenna element, from the N receive signals received by each of the M receive antenna elements for a predetermined period;
extracting a second matrix corresponding to a predetermined frequency range from the first matrix, the second matrix representing components influenced by a vital sign including at least one of respiration, pulse, and motion of the organism;
estimating a position of the organism with respect to the sensor by using the second matrix;
calculating a first distance indicating a distance between the organism and the transmit antenna and a second distance indicating a distance between the organism and the receive antenna, based on the estimated position of the organism, a position of the transmit antenna, and a position of the receive antenna;
calculating a radar cross-section value with respect to the organism by using the first and second distances; and
estimating a posture of the organism by using the calculated radar cross-section value and information indicating associations between radar cross-section values and postures of the organism stored in the memory.

* * * * *